Nov. 3, 1964  R. L. BURTNER  3,155,967

AUTOMATIC AZIMUTH MATCHING APPARATUS

Filed Oct. 17, 1955

INVENTOR.
RICHARD L. BURTNER
BY
A H Oldham
ATTY

United States Patent Office 3,155,967
Patented Nov. 3, 1964

3,155,967
AUTOMATIC AZIMUTH MATCHING APPARATUS
Richard L. Burtner, Canton, Ohio, assignor to Goodyear Aerospace Corporation, a corporation of Delaware
Filed Oct. 17, 1955, Ser. No. 540,765
4 Claims. (Cl. 343—7)

This invention relates to automatic guidance systems for aircraft, and the like, and, more particularly, to apparatus for automatically correcting azimuth errors between a previously prepared map of the terrain over which the aircraft should be passing if it is on course and a radar image of the terrain over which the aircraft is actually passing.

It has been proposed, heretofore, to automatically guide an aircraft, and the like, in flight by comparing a previously prepared map of the intended flight course with a radar image of the terrain over which the aircraft is actually passing, with appropriate error signals being generated in "fore-aft" and "right-left" directions, the error signals being employed to drive servo mechanisms to return the aircraft to the intended flight course.

It has been discovered that in addition to the "fore-aft" and "right-left" errors which result in a guidance system of the type described, that an error in azimuth may occur between the map and the radar image. Usually the error in azimuth results from errors in a flux gate compass or due to the precessing of a directional gyro when the compass and gyro are used to stabilize the radar and the radar image.

It is the general object of this invention to provide relatively simple, inexpensive, but durable apparatus for automatically determining and correcting azimuth errors in an automatically guided aircraft, and the like.

Another object of the invention is to provide a guidance system comprising a radar for producing an image of the terrain over which the aircraft is passing, a rotary antenna for the radar, means for stabilizing the antenna, a previously prepared map of the terrain over which the aircraft should be passing, the map and image having the same scale and orientation, means for comparing the map and image and for producing an error voltage when the map and image get out of orientation in azimuth, and means operated by the error voltage for re-stabilizing the antenna.

Another object of the invention is the provision in guidance apparatus of the character described of commutator means having a rotary arm and rotatively mounted points contacted by the arm, and wherein rotary movement of the points is synchronized with the scanning movement of the radar antenna, and rotary movement of the commutator arm is synchronized with the scanning movement between the map and image.

Another object of the invention is provision of guidance apparatus of the type described wherein subtraction circuits means are utilized together with a double acting commutator to produce an azimuth error voltage which is employed to correct any azimuth error.

Another object of the invention is to provide mechanism for automatically correcting for errors in means stabilizing a radar antenna in an automatic guidance system.

The foregoing objetcs of the invention, and other objects which become apparent as the description proceeds are achieved by the provision in apparatus for automatically navigating an aircraft, or the like, of a radar having a rotating antenna, means for producing a radar image of the flight path over which the aircraft is passing, a map of the flight path over which the aircraft should be passing and to the same scale and orientation but of opposite contrast to the image, means for superimposing the map and image, means for effecting relative scanning movement between the map and the image, commutator means having a contact arm rotated synchronously with the last-named means, phototube and amplifier means for determining the amount of match between the map and image and connected to the commutator arm, opposed commutator contacts rotated synchronously with the rotating antenna of the radar, subtraction circuit means connected to the opposed contacts of the commutator, and means controlled by the substraction circuit means for changing the azimuth orientation of the image with the map.

For a better understanding of the invention reference should be had to the accompanying drawings wherein.

Figure 1:
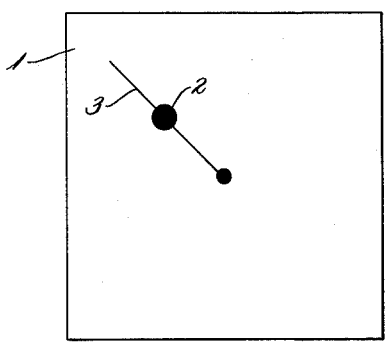
FIG. 1 is a diagrammatic illustration of a single target and sweep of a previously prepared map of the terrain over which the aircraft is intended to pass.

Having more particular reference to the drawings, the numeral 1 indicates a map of the terrain over which the aircraft is intended to fly, with this map ordinarily having been previously prepared by an actual flight over the terrain or with the map having been constructed in a sonic tank or having been prepared by artists from studies of the terrain over which the aircraft is intended to fly. The map 1 includes a target, scatterer or reflection area 2, this having been exaggerated in size, and located upon the sweep 3 of the radar scan. For purposes of simplification but a single scatterer or target 2 and only one position of the radar sweep 3 has been shown on the map 1, as will be understood.

Figure 2:
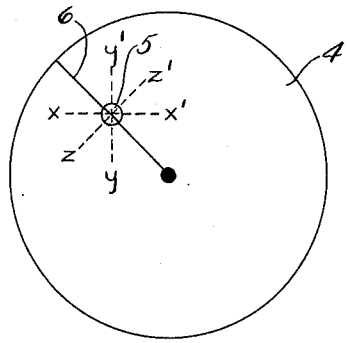
FIG. 2 is a diagrammatic illustration of a single target on a radar sweep of a radar image over which the aircraft is actually passing.

Turning now to FIG. 2, the figure illustrates a radar image 4, as for example reproduced on a cathode ray tube in known manner, of the terrain over which the aircraft is actually passing, and with a target or scatterer 5 being reproduced in one position of the radar sweep 6. Now when the map 1 and the image 4 are superimposed, in the manner hereinafter described, and with the map and image being to the same scale and orientation, but of opposite contrast, the scatterer 5 may be displaced in relation to the scatterer 2 in the direction of the X—X' axis, or in the direction of the Y—Y' axis. Errors of this type will produce "right-left" and "fore-aft" errors, and the correction of these errors will bring the aircraft back on course, all in accord with techniques described, for example, in applicant's previous application Ser. No. 247,077, filed September 18, 1951, and entitled Automatic Navigation Mechanism.

In accord with the present invention, the scatterer 5 of the radar image 4 is compared with the scatterer 2 of the map 1 in the direction of the axis Z—Z', this being at right angles to the sweep 3 and 6 of the radar scan. Correction of the position of the scatterer 5 in relation to the scatterer 2 along the axis Z—Z' results in correction in azimuth between the map 1 and the radar image 4.

Figure 3:
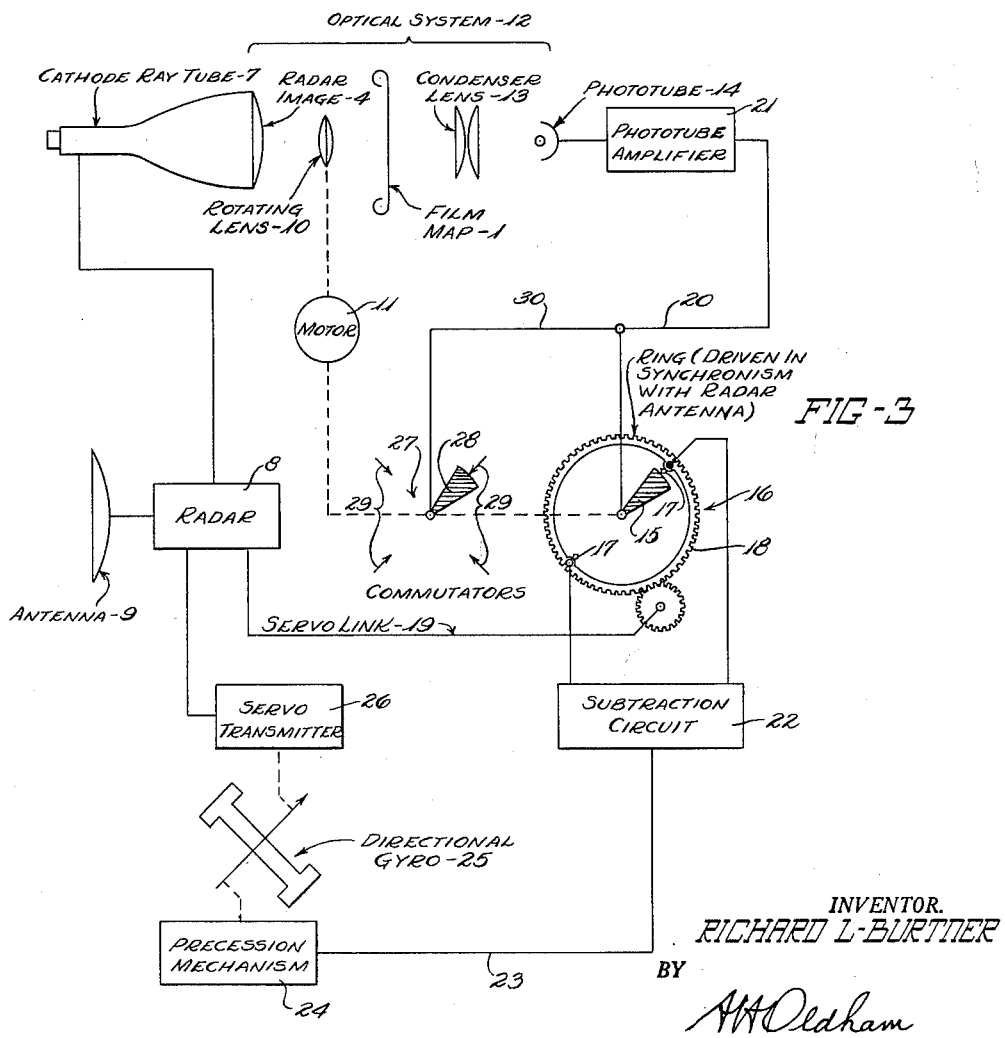
FIG. 3 is a diagrammatic illustration of the apparatus of the invention in one embodiment thereof.

FIG. 3 illustrates in detail one embodiment of the apparatus of the invention. In this figure, a map 1 is provided, this ordinarily being on film and in the form of a series of successive frames, each constituting a map somewhat further along on the terrain over which the aircraft is intended to pass together with means (not shown) for periodically advancing the film to provide the next frame of the map.

The details of the mechanism for driving the film map form no part of the present invention, and, accordingly, are not illustrated or described.

The radar image 4 is produced on the front of a cathode ray tube 7 operated by radar 8 which is provided with a rotary antenna 9 of known type.

The radar image 4 and the map 1 are optically superimposed in the manner illustrated, and nutational or scanning movement is effected between them by means of a rotating lens 10. This movement is caused by rotation of the lens by motor 11 about an axis which is parallel to the lens axis but which is slightly displaced therefrom. Instead of utilizing the rotary lens 10 and motor 11 for effecting a relative scanning or nutational movement between the map 1 and the image 4, other means or mechanism may be employed for this purpose as, for example, disclosed in applicant's copending patent application Ser. No. 76,152, filed February 12, 1949, entitled Electro Map Matching Apparatus. Completing the optical system 12 which superimposes the map 1 and radar image 4 are condenser lenses 13 and a phototube 14.

The relative scanning movement between the map 1 and image 4, as described, causes the scatterer 2 of the map 1 to move around the scatterer 5 on the image 4, and in so doing the two scatterers are consecutively displaced in all possible radial directions from the exact match point. If the amount of radial displacement between the scatterers 2 and 5 remains the same for a complete scanning or rotary movement then there is no azimuth error in the apparatus. If, on the other hand, the radial displacement between the scatterers is greater in one direction than in another, then an error in azimuth exists and error voltage is created to correct the error in azimuth, all in the manner now to be described.

The motor 11 effecting the scanning movement between the map 1 and image 4, mechanically rotates in synchronism with the scanning movement a commutator arm 15 of a commutator, indicated as a whole by the numeral 16 and including opposed contacts 17 mounted internally of a ring gear 18, with the ring gear 18 being rotated in synchronism with the rotation of the antenna 9 of the radar 8. Means, indicated diagrammatically as a servo link 19, effect the synchronised rotation of the ring gear 18 and the antenna 9. The contact arm 15 of the commutator 16 is electrically connected by lead 20 to the output of a phototube amplifier 21 connected to the phototube 14.

The contacts 17 of the commutator 16 are connected to a subtraction circuit 22, and the output of this circuit is connected by lead 23 to the precession mechanism 24 of a directional gyro 25. The directional gyro 25 controls a servo transmitter 26 which stabilizes the antenna 9 of the radar 8.

It will be understood that the apparatus of FIG. 3 includes another commutator indicated as a whole by the numeral 27 having a rotary contact arm 28, likewise driven by the motor 11 in synchronism with the scanning movement between the map 1 and the image 4. Fixed contacts 29 pick off "right-left" and "fore-aft" errors, all in a manner heretofore described in the prior patent applications referred to above. Because this portion of the apparatus does not constitute a part of the present invention, it has not been illustrated nor will it be described in detail. The contact arm 28 is connected by lead 30 to the output of the phototube amplifier 21.

In the operation of the apparatus, it will be understood that the antenna 9 is stabilized by the directional gyro 25, but that this gyro gradually precesses so that an error will develop in the guidance of the aircraft if the gradual precessing of the directional gyro 25 is not corrected. This correction of the precessing of the gyro and any attendant change in the stabilization of the antenna 9 is prevented by the apparatus of the present invention by determining the relative positions of the scatterer 2 of map 1 and scatterer 5 of radar image 4 along the Z—Z' axis as heretofore described. If the scanning movement of the map 1 and image 4, as effected by the rotation of lens 10, moves the scatterer 2 and the scatterer 5 the same distance towards Z as towards Z' then the voltage output through contacts 17 to the subtraction circuit 22 is balanced and no voltage flows from the subtraction circuit to the precessing mechanism 24.

On the other hand, should it develop that the scatterer 2 moves in relation to the scatterer 5 a greater amount towards the Z' side of the Z—Z' axis, than the output of phototube 14 and amplifier 21 operating through contact arm 15 produces unbalanced voltages at the contacts 17, and the subtraction circuit 22 then produces an error voltage which passes through lead 23 to the precession mechanism 24. This, in turn, corrects the precessing of the directional gyro 25 so as to operate through servo transmitter 26 to re-stabilize the antenna 9. This insures the azimuth orientation of the radar display or image 4 on the cathode ray tube 7 and insures that the "right-left" and "fore-aft" error information obtained from contacts 29 is much more accurate. It should be noted that the directional gyro 25 provides a long-time integration which is beneficial and which prevents instability inasmuch as the signal from the subtraction circuit 22 may be instantaneously incorrect because of "cross-talk" with the information channels including contacts 29.

In the actual use of the apparatus, it is possible to have the apparatus of the invention function only during an arcuately small portion of the rotary scanning movement of the lens 10. In other words, it is possible to take a sample of any error existing between the scatterer 2 and the scatterer 5 during an arcuately small portion of the comparison between map and image and to use this sampling of azimuth mismatch to compensate for precessing of the gyro 25.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in apparatus for automatically navigating an airplane or the like of radar means producing a substantially instantaneous image of the terrain over which the airplane is passing, a previously prepared map of the terrain of the intended flight path of the airplane of substantially the same scale and orientation as the image but of opposite contrast thereto, means for superimposing the image and map, means for effecting relative movement between the map and image to seek a match, a phototube and amplifier for determining the match between the map and image, commutator means connected to the output of the phototube and amplifier and rotated by the means for effecting relative movement between the map and image for transmitting "right-left" and "fore-aft" error voltages, a second commutator having diametrically opposed contacts rotated synchronously with the radar antenna, a commutator arm operated by the means for effecting relative movement between the map and image and connected to the output of the phototube and amplifier, subtraction circuit means connected to the opposed contacts of the second commutator, and means controlled by the subtraction circuit means for controlling the azimuth orientation of the image with the map.

2. In apparatus for automatically navigating an aircraft or the like, a radar having a rotating antenna, a directional gyro stabilizing the antenna, means responsive to said radar for producing an image of the terrain along the flight path over which the aircraft is passing, a map of the flight path over which the aircraft should be passing and to the same scale and orientation but of opposite contrast to the image, means for superimposing the map and image, means for effecting relative scanning movement between the map and image, commutator means having a contact arm and opposed commutator contacts, means for rotating the contact arm synchronously with the means for effecting relative scanning movement, phototube and amplifier means for determining the amount of match between the map and image and connected to the contact arm, means rotating the commutator contacts synchronously with the rotating antenna of the radar, subtraction circuit means connected to the commutator contacts, and means controlled by the subtraction circuit means for correcting the precessing of the directional gyro.

3. In apparatus for automatically navigating an aircraft or the like, a radar having a rotating antenna, means responsive to the radar for producing an image of the terrain along the flight path over which the aircraft is passing, a map of the flight path over which the aircraft should be passing and to the same scale and orientation but of opposite contrast to the image, means for superimposing the map and image, means for effecting relative scanning movement between the map and image, commutator means having a contact arm and opposed commutator contacts, means for rotating the contact arm synchronously with the means for effecting relative scanning, phototube and amplifier means for determining the amount of match between the map and image and connected to the contact arm, means for rotating the commutator contacts synchronously with the rotating antenna of the radar, subtraction circuit means connected to the commutator contacts, and means controlled by the subtraction circuit for changing the azimuth orientation of the image with respect to the map.

4. In a guidance system for aircraft and the like, a radar, for producing an image of the terrain over which the aircraft is passing, a rotary antenna for the radar, means for stabilizing the antenna, a previously prepared map of the terrain over which the aircraft should be passing, the map and image having the same scale and orientation, means for comparing the map and image and for producing an error voltage when the map and image get out of orientation in azimuth, and means operated by the error voltage for re-stabilizing the antenna.

References Cited in the file of this patent
UNITED STATES PATENTS
2,787,188    Berger ------------------ Apr. 2, 1957